(12) United States Patent
Matsuura

(10) Patent No.: US 6,395,315 B1
(45) Date of Patent: *May 28, 2002

(54) FERMENTATION COMPOSITION, PROCESS FOR PREPARING THE SAME, AND USE THEREOF

(75) Inventor: Shingoro Matsuura, Innoshima (JP)

(73) Assignee: Manda Formentation Co., Ltd., Hiroshima (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,970

(22) PCT Filed: Jul. 8, 1997

(86) PCT No.: PCT/JP97/02361

§ 371 (c)(1),
(2), (4) Date: Mar. 10, 1998

(87) PCT Pub. No.: WO98/01042

PCT Pub. Date: Jan. 15, 1998

(30) Foreign Application Priority Data

Jul. 10, 1996 (JP) .............................................. 8-198545
Aug. 6, 1996 (JP) .............................................. 8-221839
Aug. 30, 1996 (JP) .............................................. 8-246865
Apr. 4, 1997 (JP) .............................................. 9-100779

(51) Int. Cl.$^7$ .............................................. A23K 1/212
(52) U.S. Cl. .............................................. 426/49; 426/615
(58) Field of Search .............................. 426/49, 61, 615, 426/618, 629

(56) References Cited

U.S. PATENT DOCUMENTS 5,876,778 A * 3/1999 Stewart ........................ 426/508
6,020,016 A * 2/2000 Castleberry ................. 426/590

FOREIGN PATENT DOCUMENTS

| GB | 2234661 | * | 2/1991 |
| JP | 9224683 | * | 12/1984 |
| JP | 62-129209 | | 6/1987 |
| JP | 2-312571 | | 12/1990 |
| JP | 4-77381 A | | 3/1992 |
| JP | 6-78689 A | | 3/1994 |
| JP | 7-87899 A | | 4/1995 |

OTHER PUBLICATIONS

Bunta Oda, "Book About New Noodle (in Japanese)", Shokuhin Sangyo Shinbunsha, 1994, p. 38.
Steinkraus, *Handbook of Indigenous Fermented Foods*, p. 545–549, Jan. 1996.*
Schwartz, *Preserving*, DK Publishing, Jan. 1996, p. 14–23, 28–31, 34–35, 48–49.*

* cited by examiner

*Primary Examiner*—Keith Hendricks
(74) *Attorney, Agent, or Firm*—Smith, Gambrell & Russell, LLP

(57) ABSTRACT

Fermented and aged fruits such as apples, persimmons, bananas, pineapples, akebia, silvervine, figs, wild strawberries, wild vines, Myrica, and Ume (Japanese apricot), citrus fruits such as Navel oranges, Hassaku oranges, Mandarin oranges, Sour oranges, Iyokan oranges, kumquats, citrons, Kabosu oranges, shaddocks, Ponkan oranges, and lemons, edible roots such as Burdock, carrots, garlic, lotus root, and lily bulbs, grains such as brown rice, glutinous rice, polished rice, millet, corn, wheat, barley, and Foxtail millet, beans and sesames such as soybeans, black soybeans, black sesame, white sesame, and walnuts, seaweed such as Konbu, Wakame, Hijiki, and Laver, saccharides such as brown sugar as lump, fructose, and glucose, as well as honey, starch, cucumbers, Perilla, and celery are used as food quality improvers.

13 Claims, No Drawings

FERMENTATION COMPOSITION, PROCESS FOR PREPARING THE SAME, AND USE THEREOF

This application is a 371 PCT/JP97/02361 filed Jul. 8, 1998.

TECHNICAL FIELD

The present invention relates to a fermented composition, a method for its manufacture, and applications thereof.

The fermented composition pertaining to the present invention can be used as a growth promoter for various plants and animals, and more specifically, can be used for plants such as rice, fruit trees, farm produce, flowering plants, and trees, animals such as cattle, horses, pigs, and chickens, and seafood such as fish and shellfish.

BACKGROUND ART

Various types of fermented composition for health foods have been known in the past.

However, people have been expecting more out of fermented compositions, and there is a need for more effective fermented compositions.

Those containing nutrients and the like for a variety of organisms have been known in the past as growth promoters and the like for animals, such as plants, animals, and seafood, but they cannot be used safely.

There is thus a need for a growth promoter which can it be used safely.

SUMMARY OF THE INVENTION

Such problems are resolved by the following means in the present invention:

First, a fermented composition consisting of the following components and amino acid compositions, and obtained by the fermentation and aging of one or more fruits selected from apples, persimmons, bananas, pineapples, akebia, silvervine, figs, wild strawberries, strawberries, wild vines, grapes, Myrica, peaches, Ume (Japanese apricots), blueberries, and raspberries, one or more citrus fruits selected from navel oranges, Hassaku oranges, mandarin oranges, Sour oranges, oranges, Iyokan oranges, kumquats, Yuzu (citrons), Kabosu oranges, shaddocks, Ponkan oranges, lemons, and limes, one or more edible roots selected from Burdock, carrots, garlic, lotus root, and lily bulbs, one or more grains selected from brown rice, glutinous rice, rice, millet, corn, wheat, barley, Foxtail millet, and Sawa millet, one or more beans and sesames selected from soybeans, black soybeans, black sesame, white sesame, Azuki beans, and walnuts, one or more types of seaweed selected from Konbu, Wakame, Hijiki, and Aonori (laver), Kawanori (laver), one or more saccharides selected from black sugar, fructose, and glucose, and one or more items selected from honey, starch, cucumbers, Perilla, and celery.

Per 100 g primary component:
water: 5.0 g to 50.0 g
protein: 0.5 g to 10.0 g
lipids: 0.05 g to 10.00 g
carbohydrates (non-fibrous carbohydrates): 30.0 g to 75.0 g
carbohydrates (fiber): 0.1 g to 5.0 g
ash: 0.15 g to 5.0 g
β-carotene: 10 μg to 150 μg
Retinol potency: 10 IU to 100 IU
Vitamin $B_1$: 0.01 mg to 0.50 mg
Vitamin $B_2$: 0.01 mg to 0.50 mg
Vitamin $B_6$: 0.01 mg to 0.50 mg
Vitamin E: 10.0 mg or less
niacin: 0.1 mg to 6.0 mg
calcium: 50 mg to 900 mg
phosphorus: 200 mg or less
iron: 1.0 mg to 5.0 mg
sodium: 20 mg to 300 mg
potassium: 300 mg to 1000 mg
magnesium: 40 mg to 200 mg
NaCl deduced from Na content: 0.05 g to 1.00 g
copper: 7.0 ppm or less
Of 100 g amino acid composition:
isoleucine: 30 mg to 200 mg
leucine: 50 mg to 400 mg
lysine: 20 mg to 200 mg
methionine: 10 mg to 150 mg
cystine: 10 mg to 100 mg
phenylalanine: 30 mg to 250 mg
tyrosine: 20 mg to 200 mg
threonine: 40 mg to 200 mg
tryptophan: 1 mg to 100 mg
valine: 30 mg to 300 mg
histidine: 10 mg to 200 mg
arginine: 40 mg to 400 mg
alanine: 50 mg to 300 mg
aspartic acid: 100 mg to 600 mg
glutamic acid: 100 mg to 1200 mg
glycine: 30 mg to 300 mg
proline: 40 mg to 400 mg
serine: 30 mg to 300 mg Second, a fermented composition manufacturing method for manufacturing a fermented composition consisting of the following components and amino acid compositions by fermenting and aging one or more fruits selected from apples, persimmons, bananas, pineapples, akebi, silvervine, figs, wild strawberries, strawberries, wild vines, grapes, Myrica, peaches, Japanese apricots, blueberries, and raspberries, one or more citrus fruits selected from navel oranges, Hassaku oranges, mandarin oranges, Sour oranges, oranges, Iyokan oranges, kumquats, citrons, Kabosu oranges, shaddocks, Ponkan oranges, lemons, and limes, one or more edible roots selected from Burdock root, carrots, garlic, lotus root, and lily bulbs, one or more grains selected from brown rice, glutinous rice, rice, millet, corn, wheat, barley, Foxtail millet, and Sawa millet, one or more beans and sesames selected from soybeans, black soybeans, black sesame, white sesame, azuki beans, and walnuts, one or more types of seaweed selected from Konbu, Wakame, Hijiki, and laver, one or more saccharides selected from black sugar, fructose, and glucose, and one or more items selected from honey, starch, cucumbers, Perilla, and celery.

Per 100 g primary component:
water: 5.0 g to 50.0 g
protein: 0.5 g to 10.0 g
lipids: 0.05 g to 10.00 g
carbohydrates (non-fibrous carbohydrates): 30.0 g to 75.0 g carbohydrates (fiber): 0.1 g to 5.0 g
ash: 0.5 g to 5.0 g
β-carotene: 10 μg to 150 μg
Retinol potency: 10 IU to 100 IU
Vitamin $B_1$: 0.01 mg to 0.50 mg
Vitamin $B_2$: 0.01 mg to 0.50 mg
Vitamin $B_6$: 0.01 mg to 0.50 mg
Vitamin E: 10.0 mg or less
niacin: 0.1 mg to 6.0 mg
calcium: 50 mg to 900 mg
phosphorus: 200 mg or less
iron: 1.0 mg to 5.0 mg
sodium: 20 mg to 300 mg
potassium: 300 mg to 1000 mg
magnesium: 40 mg to 200 mg
NaCl deduced from Na content: 0.05 g to 1.00 g
copper: 7.0 ppm or less
Of 100 g amino acid composition:
isoleucine: 30 mg to 200 mg
leucine: 50 mg to 400 mg
lysine: 20 mg to 200 mg
methionine: 10 mg to 150 mg
cystine: 10 mg to 100 mg
phenylalanine: 30 mg to 250 mg
tyrosine: 20 mg to 200 mg
threonine: 40 mg to 200 mg
tryptophan: 1 mg to 100 mg
valine: 30 mg to 300 mg
histidine: 10 mg to 200 mg
arginine: 40 mg to 400 mg
alanine: 50 mg to 300 mg
aspartic acid: 100 mg to 600 mg
glutamic acid: 100 mg to 1200 mg
glycine: 30 mg to 300 mg
proline: 40 mg to 400 mg
serine: 30 mg to 300 mg The present invention contains the aforementioned fermented composition as an active component.

Specific examples include food product quality improvers, growth promoters, feed, fertilizer, and foods and drinks.

The present invention also relates to a method for manufacturing foods and drinks, such as noodles, using the aforementioned fermented composition as an additive.

Foods and drinks suitable for manufacture here include common foods that are directly eaten, as well as seasonings that are indirectly eaten, such as soy sauce or miso sauce, in short, any food directly or indirectly eaten by humans, including baby food and the like.

The scope of the present invention should not be narrowly interpreted solely in terms of the specific numerical values noted in the Claims or the means for resolving the aforementioned problems, since such values may differ depending on the subject of measurement, the measurement method, measuring errors, and the like, and any effects similar to those pertaining to the present invention should be interpreted as falling within the scope of the present invention.

The fermented composition pertaining to the present invention is manufactured in the following manner.

First, mandarin oranges, citrons, silvervine, figs, bananas, Burdock root, carrots, pineapples, grapes, akebi, wild vines, wild strawberries, Sour oranges, Hassaku oranges, apples, Myrica, navel oranges, garlic, kumquats, and the like which have been washed with water and then crudely pulverized are mixed.

After these have been mixed, black sugar is added, and the mixture is fermented while occasionally stirred at a temperature of −4° C. to 40° C., preferably −3° C. to 30° C., and even more preferably −2° C. to 20° C., after which wheat, honey, corn, millet, lotus root, walnuts, lily bulbs, soybeans, brown rice, corn starch, rice, Japanese apricots, persimmons, Konbu, Hijiki, laver, sesame, glutinous rice, or the like are mixed in.

The fermented composition is manufactured by fermenting and aging the mixture while occasionally stirring it at a temperature of −4° C. to 40° C., preferably −3° C. to 30° C., and even more preferably −2° C. to 20° C., and then filtering the product.

The fermented composition thus obtained can be eaten as such, and said fermented composition can also be used as an active component of a food quality improver.

Analysis of the fermented composition manufactured under the aforementioned conditions yielded the following results.

Specifically, water: 33.8 g/100 g; protein: 2.1 g/100 g; lipids: 0.1 g/100 g; carbohydrates (non-fibrous): 61.4 g/100 g; carbohydrates (fiber): 0.8 g/100 g; ash: 1.8 g/100 g; β-carotene: 95 μg/100 g; Retinol potency: 55 IU/100 g; Vitamin $B_1$: 0.02 mg/100 g; Vitamin $B_2$: 0.07 mg/100 g; Vitamin $B_6$: 0.36 mg/100 g; Vitamin E: 1.2 mg/100 g; niacin: 1.54 mg/100 g; calcium: 120 mg/100 g; phosphorus: 43 mg/100 g; iron: 2.4 mg/100 g; sodium: 57 mg/100 g; potassium: 670 mg/100 g; magnesium: 70 mg/100 g; NaCl deduced from Na content: 0.1 g/100 g; and copper: 1.0 ppm.

Of the 100 g of the amino acid composition: isoleucine: 74 mg; leucine: 130 mg; lysine: 77 mg; methionine: 35 mg; cystine: 24 mg; phenylalanine: 85 mg; tyrosine: 55 mg; threonine: 67 mg; tryptophan: 19 mg; valine: 95 mg; histidine: 45 mg; arginine: 85 mg; alanine: 85 mg; aspartic acid: 240 mg; glutamic acid: 300 mg; glycine: 65 mg; proline: 110 mg; and serine: 82 mg.

It has been shown that consuming the fermented composition as such warms the body and produces energy after consumption.

The flavor and the like of various foods and drinks are improved when the fermented composition obtained above is added during food and drink manufacturing processes.

When the fermented composition is added during a food and drink manufacturing process, the fermented composition can be mixed at any stage during a process for manufacturing foods and drinks that are directly eaten, such as cold noodles or fried foods such as tempura or batter fried foods, or the fermented composition can be added as an active component to indirectly eaten food product materials, seasonings, sauces, and the like.

Food quality improvers featuring the use of the fermented composition thus obtained as an active component can improve the quality of food products when used to cook various kinds of foods.

Food quality can also be improved when various kinds of food materials, seasonings, and sauces which are used during the manufacture of foods and drinks contain the fermented composition pertaining to the present invention as an active component.

Objects suitable for the use of the food improver pertaining to the present invention, foods and drinks suitable for manufacture in the present invention, and food material and seasonings to which the fermented composition is added as an active component include sweets, noodles, tofu, tempura flour, dressings, meat sauces, Neopolitan sauces, vinegars, fruits, vegetables, salads, and the like, materials used when food is cooked, and seasonings which are used when food is eaten, as well as refreshment beverages, fruit beverages, beer, wine, cigarettes, and the like, of which the following are specific examples.

Meats such as Beef, Chicken and Pork. Edible fish & Crustaceans (not live) such as Ark shell, Short-necked clams, Sweetfish, Abalones, Cuttlefish/Squid/Calamary, Salmon roe, Sardines, Sea Urchins, Shrimp/Prawns/Lobsters, Oysters, Herring roe, Crabs, Flat fish, Caviar, Whales, Carp, Salmon, Crayfish, Marckerel pike, Edible frogs, Sea trout roe, Sea bass, Snapping turtle, Sea bream (red snappers), Octopuses, Cod, Pollack roe, Herrings, Hard-shell clams, Yellow tail, Tuna fish, and Mussels.

Meat products such as Kasuzuke meats (meats seasoned in sake lees), Dried meats, Sausages, Canned meats, Tsukudani of meat (preserved meats boiled in soy sauce), Bottled meats, Ham and Bacon.

Processed marine products such as kasuzuke fish/shellfish (fish/shell fish pickled in sake lees), Kamaboko (steamed fish paste), Smoked fish/shellfish, Salted fish/shellfish, Salted and dried fish/shellfish, Canned marine products, Tsukudani marine products (preserved marine products boiled in soy sauce), Bottled marine products, Fish/shellfish dried in the shade of the sun, Chikuwa (bamboo-shaped broiled fish paste), Boiled and dried fish/shellfish, Hanpen (pounded fish cakes) and Fish sausages.

Katsuobushi (dried bonito), Agar-agar, Kezuribushi (dried bonito shavings), Tororokonbu (scraped kelp), Dried laver, Dried hijiki (dark brown algae), Dried Wakame seaweed and Toasted lavar.

Processed vegetables and Processed fruit such as Canned fruit/Bottled fruit, pickled fruit, Dried fruit, Dried vegetables, Jams, Vegetable juices for cooking, Chocolate spread, peanut butter, Ground almonds, Marmalade, Mianma (pieces of fermented and dried bamboo shoots), Canned or bottled vegetables and Pickled vegetables.

Processed eggs such as Dried eggs and Frozen eggs.

Milk products such as Milk, Cream, Cheese, Fermented lactic drinks, Lactic acid bacteria beverage, Butter, Fermented milk, Powdered milk, Goats' milk, Sheep's milk and Condensed milk.

Vegetable oils/fats such as olive oil (for food), Corn oil, Sesame oil, Soy been oil, Compound oil, Rape oil (for food), Rice bran oil, Palm oil, Sunflower oil (for food), Coconut oil and Peanut oil.

Animal oils/fats such as Beef fat, Whale fat, Bone oil and Pork fat.

Processed oils/fats such as Edible hardening oil, Shortening, Powdered oil and fat, and Margarine.

Mixes for curry/stew/soup such as Instant/pre-cooked curry, Instant/pre-cooked stew, Instant/pre-cooked soup and Instant/pre-cooked Miso soup.

Namemono (fermented edible soybean paste, not for soup) such as Kinzanji-miso (fermented soybean paste with vegetables, not for soup) and Tai-miso (fermented soybean paste with red snapper meat, not for soup).

Ochazuke-nori (dried lavar for flavoring boiled rice with green tea) and Furikake (seasoning granules for boiled rice).

Aburaage or aburage (fried soybean curd), Koridofu (soybean curd frozen and then dried), Konnyaku (jelly made from devil's tongue root), Soybean milk, Tofu (soybean curd) and Natto (fermented soybeans).

Coffee & Cocoa such as Coffee, Artificial coffee, Coffee beverages with milk, Cocoa, Chocolate-based beverages and Cocoa Beverages with milk.

Tea such as Oolong tea (Chinese tea), Black tea (English tea), Konbu-cha (salty drinks of powdered kelp), Mugi-cha (parched barley tea) and Green tea (Japanese tea).

Miso (fermented soybean paste) for soup, Worcester sauce, Ketchup, Soy sauce, Vinegar, Essence of vinegar, Soba-tsuyu (soup for soba), Salad dressing, White sauce, Mayonnaise, Sauce for barbecued meat, Lump sugar, Fructose, Rock sugar (not confectionery), Sugar, Maltose, Honey, Glucose for food, Saccharized starch powder, Thick malt syrup (not confectionery), Cooking salt mixed with sesame seeds, Cooking salt, Ground sesame seeds, Celery salt, Chemical seasonings, spices, and Aromatic preparations for food (other than "Essential oils").

Rice, Husked barley, Flour for food and Gluten for food such as Rice, Husked barley, Arrowroot starch, Wheat flour, Rice flour, Corn starch, Sago palm starch (sago), Sweet potato starch, Potato flour (for food), Buckwheat flour, Tapioca flour, Corn flour (maize flour), Bean flour and Barley flour.

Cereal preparations (farinaceous foods) such as Uncooked udon noodles (Japanese noodles of wheat flour), Oat flakes, Oatmeal, Boiled and dried rice, Enriched rice, Coatings for dumplings stuffed with minced pork, Corn flakes, Powdered bean jam, Artificial rice, Spaghetti, Uncooked somen noodles (very thin wheat noodle), Instant or precooked udon noodles, Instant or precooked soba noodles, Instant or precooked Chinese noodles, Uncooked soba noodles (Japanese noodles of buckwheat flour), Uncooked Chinese noodles, Harusame (translucent noodles made from starch), Bread crumbs, Mifen (Chinese rice noodles), Fu (fluffy wheat gluten cakes), Canned boiled rice, Macaroni and Mochi (pounded rice cake).

Sandwiches, Sushi, Pizzas, Boxed lunches, Meat pies and Ravioli.

Japanese confectionery such as Ama-guri (chestnuts roasted with syrup), Amanatto (sugared red beans), Ame (starch-base candy), Arare (pellet-shaped rice crackers), Ankoro-mochi (rice dumplings with sweet bean jam), Iriguri (roasted chestnuts), Iri-mame (roasted beans), Okoshi (sweet cake of millet and/or popped rice), Karinto (fried dough cookies), Gyuhi (thinly rolled soft pounded rice cake, like Turkish delight), Kingyoku (sugared agar-agar gelatin), Rock sugar, Sugar-preserved food, Shiruko (sweet soup of red bean flour with pounded rice cake), Instant shiruko, Zenzai (sweet red bean soup with pounded rice cake), Powdered zenzai, Senbei (Japanese crackers made of rice or the like), Dango (sweet dumplings), Nerikiri (sweetened paste cake), Mizuame (millet syrup), Mitsumame (mixture of cold agar-agar gelatin cubes, mandarin orange slices and syrup), Mushi-gashi (steamed cake), Mochi-gashi (bean jam cake), Monaka (wafers filled with bean jam), Wafer-shells for monaka, Yudeadzuki (boiled and sweetended red beans= adzuki beans), Yokan (sweet red bean jelly), Rakugan (dried sweet cake of rice flour pressed into various shapes), Syouga-yu, Kinkan-yu and Ame-yu.

Western-style confectionery such as Ice candy, Ice cream, Wafers, Castella cake, Ship biscuits (pilot bread), Caramels, Candy (sweets), Cookies, Crackers, Ice-cream cones, Sherbets (sorbets), Cream puffs, Sponge cake, Toffee, Chewing gum, Chocolate, Doughnuts, Lozenges/pastilles, Nougat, Pies, Biscuits, Ball cake, Pancake, Popcorn, Marshmallows, Baked apples, Rusks and Waffles.

Bread & Buns such as Bean jam buns, Cream buns, Jam buns, Bread and Buns.

Instant cakes/Dessert mixes such as Instant jelly mixes, Instant doughnut mixes, Instant pudding mixes, Instant pancake mixes and Instant mizu-yokan mix (soft sweet jelly mixes of red bean or adzuki).

Instant ice cream mixes, Instant sherbet mixes, Almond paste, Yeast powder, Koji (fermented cereals, typically rice, treated with enzyme-producing mucor called Aspergillus oryzae), Yeast, Baking powder, Binding agents for ice cream, Meat tenderizers for household purposes, preparations for stiffening whipped cream and Sake cake (edible soft cake of rice wine).

Fruit such as Almonds, Strawberries, Oranges, Persimmons, Cashew nuts, Chestnuts, Walnuts, Cola nuts, Coconuts, Watermelons, Pears, Bananas, Loquats (medlar fruit), Grapes, Hazelnuts, Pine cones, Mandarin oranges, Melons, Peaches, Apples and Lemons.

Vegetables and Tea leaves such as Green soybeans, Pumpkins (marrows/squashes), Cabbages, Cucumbers, Burdock roots, Sweet potatoes, Kidney beans, Sanshoh (Japanese aromatic peppers), Shiitake mushrooms, Beefsteak plant leaves (perilla leaves), Potatoes, Ginger, Flowering ferns, White radishes, Bamboo shoots, Japanese lettuce, Red peppers, Tomatoes, Eggplants, Carrots, Leeks, Chinese cabbage, Parsley, Fuki (Japanese butterbur=coltsfoot), Spinach, Pine mushrooms, Bean sprouts, Wasabi (Japanese Horseradish) and Warabi (Japanese mountain bracken= Japanese brake fern).

Guarana drinks, Mineral water, Coffee syrups, Cola drinks, Soda pops, Sherbets (beverages), Syrups for beverages, Ginger ale, Essences for soft drinks, Aerated water/soda water, Carbonated lemonades, Plain lemonades, Lemon squashes, Orange juice, Grape juices, Tomato juices (beverages), Pineapple juices, Apple juices, Vegetable juices and Whey beverages.

Awamori (distilled spirits of millet), synthetic sake (Artificial rice wine), Shochu (Japanese white liquor), Shirozake (cloudy, sweet sake), Sake (Japanese rice wine), Naoshi (clear, sweet sake), Mirin (sweet sake used for seasoning), Whiskey (whisky), Vodka, Gin, Bitters, Brandy, Rum, Liqueurs, Strawberry wine, Perry (pear cider), Wine, Cider and Chinese liquors.

Spiced or flavored liquors such as Umeshu (white liquor containing Japanese plum extracts), Kokotsu-shu (Chinese tonic liquor which contains toasted tiger bone extracts), Ninjin-kinatetsu wine (sweet wine containing ginseng and ferric quinine citrate), Meads (Hydromel), Homei-shu (rice wine containing herb extracts), Matsuba-zake (liquor flavored with pine needle extracts) and Mamushi-zake (Tonic liquor containing viper extracts).

The growth promoter pertaining to the fermented composition of the present invention is effective as a promoter of growth for various organisms, including plants which are the object of agriculture and horticulture, domestic animals which are raised, and seafood raised by pisciculture.

The growth promoter pertaining to the fermented composition of the present invention can be used to grow rice plant, green tea, black tea, coffee, Japanese pears, melons, strawberries, plums, peaches, watermelons, sweet cherries, figs, mandarin oranges, apples, grapes,, Hasukappu, carnations, Casa Blanca and other lilies, roses, Western orchids, sunflowers, herbs, cucumbers, onions, cabbage, cauliflowers, asparagus, tomatoes, Japanese radishes, carrots, green peppers, Moroheiya (mulu-khiya), taro, potatoes, sweet potatoes, spring onions, spinach, bean sprouts, lotus root, Chinese cabbage, pumpkin squash, kidney beans, fresh green soybeans, broad beans, soybeans and other pulse crops, it can be used in the afforestation and cultivation of nusery stock, graftings, and cuttings of cedars, pines, and the like, it can be used to grow cardamom and other spices, Karubamu, grass, laver, or to raise chickens, pigs, cattle, horses, sheep and other such animals, it can be used to raise yellowtail, young yellowtail, eels, shellfish and other seafoods, and it can be used to control the growth of green lawns in golf courses.

Rice bran, fish meal, and the like obtained from plants and seafood grown with the growth promoter pertaining to the fermented composition of the present invention are extremely effective as fertilizer.

The growth promoter pertaining to the fermented composition of the present invention can also revive the soil, that is, improve the dirt, when used with organic fertilizer for upland farming and the like.

When used in the cultivation of rice plant, the growth promoter pertaining to the fermented composition of the present invention should be sprayed on the leaves three times in the form of a solution diluted 5000-fold at the time of use at the nursery stage and used in the form of a solution diluted 10,000-fold in the irrigating water 3 days prior to transplantation, and it should be sprayed on the leaves 4 times in the form of a solution diluted 5000-fold in paddies.

When the growth promoter pertaining to the fermented composition of the present invention is used for tomatoes, it should be used in a concentration of 5000-fold to 20,000-fold, and preferably about 7000-fold.

When the growth promoter pertaining to the fermented composition of the present invention is used on plants, care should be taken to avoid insufficient water during the period of growth, particularly for vegetables, fruit trees, and green houses.

Care should be taken to avoid insufficient nitrogen during the period of growth, ample amounts of organic fertilizer should be ensured, and the growth promoter pertaining to the fermented composition of the present invention should be used in the concentration suited to the object for which it is used.

When the growth promoter pertaining to the fermented composition of the present invention is diluted, clean water should be used by allowing ground water to pool for a day.

The growth promoter pertaining to the fermented composition of the present invention is used effectively for high-stress crops, and is particularly effective for rice plant.

A basic method for spraying the growth promoter pertaining to the fermented composition of the present invention is to spray the leaves because the reverse sides of the plant leaves generally have an abundance of stomas, through which the diluted solution of the growth promoter is absorbed.

The use of the growth promoter pertaining to the fermented composition of the present invention for rice plant is described in detail below according to period. When the seeds are soaked, they are soaked in a solution diluted 1000-fold at the time of use after the seeds have been disinfected.

This will promote germination and allow the buds to germinate uniformly.

Then, during the seedling stage, the growth promoter pertaining to the present invention is used in the form of a solution diluted 5000-fold at the time of use for irrigation or leaf spraying with a watering can, based on 1 liter per square meter.

This allows well-rooted seedlings with an abundance of roots and thick stems to be grown.

Although rice is usually transplanted during the young seedling stage, when the growth promoter pertaining to the fermented composition of the present invention is used, the roots are grown sufficiently even in nursery seedlings within 10 days following rice transplanting, and the rice plant can therefore be transplanted even during the nursery seedling stage.

When rice is thus transplanted during the nursery seedling stage, the seedling are transplanted to paddies as soon as they come up.

At the tillering stage, the growth promoter pertaining to the present invention is used in the form of a solution diluted 5000-fold at the time of use for spraying in 7 to 10 day intervals, based on 150 liters per 10 ares.

This allows the rice roots to spread well, the growth rate to be improved, the yield to be increased, and disease and insect injury to be avoided.

At the young panicle formation stage, the growth promoter pertaining to the present invention is used in the form of a solution diluted 5000-fold at the time of use for spraying at 7 to 10 day intervals, based on 150 liters per 10 ares.

This allows degeneration to be avoided, the number of rice panicles to be increased, the rice yield to be increased, as well as color, flavor, and fragrance to be enhanced.

At the ripening stage, the growth promoter pertaining to the present invention is used in the form of a solution diluted 5000-fold at the time of use for spraying at 7 to 10 day intervals, based on 150 liters per 10 ares, and it is finally sprayed in the form of a solution diluted 3000-fold at the time of use about 10 days prior to harvesting.

This allows high quality, good-tasting rice to be obtained.

The general use of the growth promoter pertaining to the present invention for plants is described below.

The thicker the concentration of the diluted solution of the growth promoter pertaining to the present invention, the more vigorous the plant growth activity, and thus the higher the absorbing power of the fertilizer, but since this may be considered a drawback during the growing stages, the growth promoter should be used in a concentration diluted about 10,000-fold at this time, and at a concentration of around 5000-fold in the latter half of the growth period.

When the growth promoter is used with other materials (except for agrochemicals), it should be used in diluted concentrations to enhance the action of said other materials.

In general, the growth promoter can be used in each of the seed soaking, seedling, and growth stages, but it is more effectively used during transplantation, when there are environmental changes such as inadequate sunlight, inadequate temperature, and the like, or during stages of crop transition such as around transplantation, around flowering, around fruition, and after recovery from injury.

When the growth promoter pertaining to the present invention is used, high temperature should be avoided during leaf spraying or irrigation.

No spreaders are needed when crops are enclosed in extremely small groups during spraying.

In the case of fruit trees and the like, it is useful to spray the growth promoter pertaining to the present invention following harvest to allow the tree vitality to recover in preparation for the next year's harvest.

It is possible to recover the tree vitality by spraying the growth promoter on weak trees.

The growth promoter pertaining to the present invention is preferably diluted 10,000-fold when used for various crops, and the following is recommended when used three times a month.

For green vegetables, the promoter should be sprayed about 5 to 6 times per crop, based on an amount of about 100 liters/10 ares each time.

For fruit vegetables, the promoter should be sprayed about 12 to 20 times per crop, based on an amount of about 150 liters/10 ares each time.

For fruit trees, the promoter should be sprayed about 12 to 15 times per crop, based on an amount of about 250 liters/10 ares each time.

For paddy rice, the promoter should be sprayed about 8 times per crop, based on an amount of about 150 liters/10 ares each time.

When the growth promoter pertaining to the present invention is sprayed on crops, it may also end up being sprayed on weeds and the like around the crops, but since weeds are stress-free, the growth of the weeds themselves is not promoted very much.

In this regard, the effects of the growth promoter for target crops are pronounced because of the high stress due to quality improvement, variation in time period, excess vegetation (excess fertilization), and the like.

When plants are cultivated using the growth promoter pertaining to the present invention, the plants themselves become stronger, so agrochemical spraying or pest extermination can be reduced, the environment is not polluted, and agricultural worker health is better off.

Because contact with agrochemicals must generally be avoided when herbicides and pesticides are sprayed, heavy equipment is needed, but the growth promoter pertaining to the present invention is nontoxic and does not harm humans, so there is no need for heavy equipment, and spraying can be easily managed.

When the growth promoter pertaining to the present invention is used to cultivate plum trees, sweet cherries, and the like in green houses, bees are attracted to the green house, making artificial pollination unnecessary.

When foods and drinks are manufactured using the fermented composition pertaining to the present invention, the manufactured food has better consistency and is sweeter, making it possible to provide better flavor.

When the fermented composition pertaining to the present invention is used to prepare food products featuring meat materials, the meat is more tender, is more readily separated from bone, and is easier to eat.

When the fermented composition pertaining to the present invention is used to prepare noodles, the noodles thus prepared have better consistency.

Because the growth promoter pertaining to the fermented composition of the present invention relieves stress by improving the internal balance of the organisms being treated, the health of the organisms is vastly improved, allowing the promoter to be used with confidence.

For example, when the growth promoter pertaining to the fermented composition of the present invention is used to cultivate plants, the plants themselves are raised in an extremely healthy manner, allowing the roots to spread well and the nutrient absorbing capacity to be enhanced.

As a result, there is better resistance against damage due to insufficient sunlight or climate irregularities as well as against weeds and insect pests, less withering, faster growth periods, better yields at lower costs, better quality crops, and fewer growth irregularities.

In particular, when the growth promoter pertaining to the fermented composition of the present invention is used for rice cultivation, the rice plants is firmer, thicker, and longer, is not susceptible to pests, and is resistant to cold injury or diseases such as blast, resulting in 20 to 50% higher yields, while the harvested rice is resistant to oxidation, is more durable, has fewer changes in quality over long periods of time, and has better taste.

Furthermore, when the growth promoter pertaining to the fermented composition of the present invention is used for fruits and vegetables, the taste is generally not bitter. Specifically, apples, persimmons, grapes, and peaches are less astringent, green peppers, Spring onions, and spinach are less raw-tasting and bitter, potatoes are not as pungent, and onions and green peppers are not as spicy.

When the growth promoter pertaining to the fermented composition of the present invention is used for fruits, the fruit is firmer, Brix. (the sugar content) is higher, and the taste is better. When the promoter is used for flowering trees, the flower color is more vivid. When the promoter is used to cultivate fruit trees such as apple trees, the leaves are firmer and thus more easily defoliation.

In particular, when the growth promoter pertaining to the fermented composition of the present invention is used to cultivate peaches, the vitality of the peach tree is strengthened, and the bark takes on a reddish luster.

When the growth promoter pertaining to the fermented composition of the present invention is used when planting saplings, grafting, planting cuttings, and transplanting, they take root more efficiently.

When the growth promoter pertaining to the fermented composition of the present invention is used to raise cattle, pigs, and the like, the health of the animals can be protected by correcting enterobacterial disorders, thereby making cattle, pigs, and the like more resistant to disease.

It is thus no longer necessary to use large amounts of antibiotics as in the past, making it possible to provide healthier and safer meat.

The use of the fermented composition pertaining to the present invention improves coloring of fish and is effective for farming and raising carp and the like.

BEST MODE FOR CARRYING OUT THE INVENTION

Example 1

An example of a method for manufacturing the fermented composition pertaining to the present invention is described in Example 1. The fermented composition in this Example was manufactured under the environmental conditions in Innoshima City in Hiroshima prefecture, Japan.

First, tangerines, citrons, silvervine, figs, bananas, Burdock root, carrots, pineapples, grapes, akebia, wild vines, wild strawberries, Sour oranges, Hassaku oranges, apples, Myrica, navel oranges, garlic, kumquats, and the like which had been washed with water and then crudely pulverized were mixed.

After these had been mixed, black sugar was added, and the mixture was fermented while occasionally stirred at a temperature of −2° C. to 20° C., after which wheat, honey, corn, millet, lotus root, walnuts, lily bulbs, soybeans, brown rice, corn starch, rice, Japanese apricots, persimmons, Konbu, Hijiki, laver, sesame, glutinous rice, and the like were mixed in.

A fermented composition was manufactured by fermenting and aging the mixture while occasionally stirring it at a temperature of −2° C. to 20° C., and then filtering the product.

Analysis of the fermented composition manufactured under the aforementioned conditions yielded the following results.

Specifically, water: 33.8 g/100 g; protein: 2.1 g/100 g; lipids: 0.1 g/100 g; carbohydrates (non-fibrous): 61.4 g/100 g; carbohydrates (fiber): 0.8 g/100 g; ash: 1.8 g/100 g; β-carotene: 95 μg/100 g; Retinol potency: 55 IU/100 g; Vitamin $B_1$: 0.02 mg/100 g; Vitamin $B_2$: 0.07 mg/100 g; Vitamin $B_6$: 0.36 mg/100 g; Vitamin E: 1.2 mg/100 g; niacin: 1.54 mg/100 g; calcium: 120 mg/100 g; phosphorus: 43 mg/100 g; iron: 2.4 mg/100 g; sodium: 57 mg/100 g; potassium: 670 mg/100 g; magnesium: 70 mg/100 g; NaCl deduced from Na content: 0.1 g/100 g; and copper: 1.0 ppm.

Of the 100 g of the amino acid composition: isoleucine: 74 mg; leucine: 130 mg; lysine: 77 mg; methionine: 35 mg; cystine: 24 mg; phenylalanine: 85 mg; tyrosine: 55 mg; threonine: 67 mg; tryptophan: 19 mg; valine: 95 mg; histidine: 45 mg; arginine: 85 mg; alanine: 85 mg; aspartic acid: 240 mg; glutamic acid: 300 mg; glycine: 65 mg; proline: 110 mg; and serine: 82 mg.

The water was analyzed by heated drying at ordinary pressure, the protein was analyzed by the Kjeldahl method, the lipids were analyzed by ether extraction, the carbohydrates (fiber) were analyzed by the modified Hannibal Gustoman method, and the ash was analyzed by the ashing method.

The fermented composition thus obtained has been commercially available under the tradename Manda Enzyme by MANDA FERMENTATION CO., LTD. in Japan since Apr. 1, 1997.

It has been shown that consuming the fermented composition as such warms the body and produces energy after consumption.

Example 2

Frozen Pre-Cooked Noodles

First, 1000 kg wheat flour, 3.04 kg table salt, and 34.96 kg water were blended and kneaded with 0.012 kg of the fermented composition prepared as a food quality improver in Example 1 above, and 0.30 kg powdered starch and 2.86 kg vegetable oil to facilitate noodle handling were then added to prepare udon noodles.

The aforementioned udon noodles were then placed in boiling water to make boiled noodles, and the boiled noodles were then prepared with seasoning, seasoned pork, vegetables, and the like to make cooked noodles.

The cooked noodles were then promptly frozen to make frozen pre-cooked noodles.

As a control, comparative frozen pre-cooked noodles were manufactured by the same methods under the same conditions as above except that no fermented composition was used.

The control frozen pre-cooked noodles and the frozen pre-cooked noodles of the present invention manufactured using the food quality improver pertaining to the present invention were thawed for 10 minutes in boiling water.

Both sets of cooked noodles were given to a panel of 10 individuals to eat, and were evaluated for consistency, with the following results.

Seven members rated the noodles of the present invention has having better consistency than the control, one member rated the two as having no differences, and two members rated the noodles of the present invention as having worse consistency.

The results thus show that the present invention was effective in improving the consistency of frozen pre-cooked noodles.

Example 3

Soy Sauce 3 g of the fermented composition prepared as a food quality improver in Example 1 above and 100 g of Royal Mago soy sauce (dark) were mixed and stirred together, the mixture was allowed to stand for 10 minutes, and the supernatant was collected to make the soy sauce pertaining to the present invention.

Royal Mago soy sauce (dark) was used unmodified for the control.

The two soy sauces were eaten with tofu, and the inherent flavor of the soy sauces was investigated, revealing that the soy sauce pertaining to the present invention had a milder and mellower saltiness.

Example 4

Tempura 1 weight part of the fermented composition prepared as a food quality improver in Example 1 above was mixed with 5000 weight parts of batter obtained by wetting tempura flour with water, and shrimp and the like were battered and fried to make tempura.

The resulting tempura was crunchier than that obtained without the use of the fermented composition.

Example 5

Chicken Wings 1 kg of chicken wings were marinated for 30 minutes in about 0.09 L of a sauce to which had been added a little of the fermented composition prepared as a food quality improver in Example 1 above, and the wings were then cooked with far infrared rays while basted with the sauce using a brush.

The product of the present invention was more tender and had a mellower taste, and the meat was more readily separated from the bone and had a more attractive color than that obtained without the use of the fermented composition.

Example 6

Rib Steak 1 weight part of the fermented composition prepared as a food quality improver in Example 1 above and 500 weight parts water were mixed with rib steak meat, the meat was allowed to stand for 30 minutes to 1 hour while misted until drenched, and it was then cooked.

The meat of the present invention was more tender and tasted better than meat cooked without the use of fermented composition.

Example 7

Corn Soup

Corn soup was prepared by adding 1 weight part of the fermented composition prepared as a food quality improver in Example 1 above to 5000 weight parts of corn soup comprising 1 can of creamed corn, 2 cans of whole corn, 1 L of milk, and seasoning.

The resulting corn soup had better taste and consistency than that obtained without the use of the fermented composition.

Example 8

Milk 1 weight part of the fermented composition prepared as a food quality improver in Example 1 above was mixed with 3000 weight parts milk.

The resulting milk was sweeter than that obtained without the use of the fermented composition.

Example 9

Nikomi (Stew)

1 weight part of the fermented composition prepared as a food quality improver in Example 1 above was added to 10,000 weight parts of stew and simmered with Daikon radish.

5000 weight parts water, 1 weight part fermented composition prepared as a food quality improver in Example 1 above, and small amounts of soy sauce, Sake, and Mirin sauce were mixed, and the Daikon radish boiled with beef was added to the mixture, which was simmered for about 3 hours to make a stew.

The resulting stew was more tender, with better penetration of the Daikon radish taste, than that obtained without the use of the fermented composition.

Example 10

Crab Croquette 1 weight part of the fermented composition prepared as a food quality improver in Example 1 above was introduced into a sauce comprising mixture of 3000 weight parts white sauce, 500 g crab, 2 onions, and 2 egg yolks, and the pieces were then breaded and fried in oil to make crab croquettes.

The resulting crab croquettes were sweeter and had better consistency than those obtained without the use of the fermented composition.

Example 11

Cooked Rice

Rice was cooked using 1 weight part fermented composition prepared as a food quality improver in Example 1 above per 5000 weight parts water.

The cooked rice was sweeter, making it particularly desirable for sushi rice, than rice cooked without the fermented composition.

The cooked rice and rice cooked without the fermented composition was stored for 3 days in a refrigerator, then heated in a microwave, and eaten, revealing that the rice cooked with the fermented composition tasted the same as fresh cooked rice.

Example 12

Salad

Lettuce and cucumbers were soaked in a mixture of 10,000 weight parts water and 1 weight part fermented composition prepared as a food quality improver in Example 1 above.

The resulting salad was eaten and was crisper than that soaked for 30 minutes in water containing no fermented composition.

When the cucumbers were sliced, those featuring the use of the fermented composition discolored less where cut than did those with which none was used.

Example 13

Chinese Chive

Scallions were transplanted with about 40 to 45 cm between row width and about 25 cm between plants.

The fertilizer was cow manure (15 t/10 a) and chemical fertilizer comprising 25 kg/10 a N, 30 kg/10 a P, and 20 kg/10 a K.

During the growth stage, growth promoter commercially available under the tradename "Manda No. 31" by MANDA FERMENTATION CO., LTD. was diluted 10,000 fold in water to irrigate the base of the plants in amounts of 750 L/10 a.

As a control for comparison with the areas of the present invention featuring the use of the aforementioned growth promoter, Chinese chive were grown under the same conditions except that no diluted solution of the growth promoter was used, the bactericides Benlate and Basitac were used, and the pesticides Supracide and Diazinon were used.

A comparison of the areas revealed the following characteristics in the area of the present invention.

There was little withering of underleaves.

An abundance of bloom was produced (enhanced immune potency).

The yield was 20% greater than the control area.

There were virtually no aphides, despite the lack of soil disinfection.

Example 14

Cabbage

Sown and transplanted cabbage plants were transplanted (3000/10 a) at a 130 cm row width, with about 50 cm between plants, in 2 lines 60 cm apart (zigzag).

For initial fertilization, N 24 kg/10 a, P 20 kg/10 a, and K 22 kg 10 a were used. For follow-up fertilization, N 4 kg/10 a was used.

During the growth stage, growth promoter commercially available under the tradename "Manda No. 31" by MANDA FERMENTATION CO., LTD. was diluted 10,000 fold in water, and 150 L/10 a was sprayed for a total of 14 times every 10 days.

As a control for comparison with the areas of the present invention featuring the use of the aforementioned growth promoter, cabbage plants were grown under the same conditions except that no diluted solution of the growth promoter was used.

Twelve cabbage plants grown in each area were randomly selected and the bulbs were weighed, revealing a mean bulb weight of 1343 g in the control area and a mean bulb weight of 1563 g in the area of the present invention.

Example 15

Daikon Radish

Daikon radishes were transplanted (5100/10 a) at a 130 cm row width, with about 30 cm between plants, in 2 lines 40 cm apart (zigzag).

For initial fertilization, N 12 kg/10 a, P 10 kg/10 a, and K 11 kg 10 a were used. For follow-up fertilization, N 4 kg/10 a was used.

Growth promoter commercially available under the tradename "Manda No. 31" by MANDA FERMENTATION CO., LTD. was diluted 10,000 fold in water, and 150 L/10 a was sprayed for a total of 0.9 times every 10 days.

As a control for comparison with the areas of the present invention featuring the use of the aforementioned growth promoter, Daikon radishes were grown under the same conditions except that no diluted solution of the growth promoter was used.

Twenty Daikon radishes grown in each area were randomly selected and weighed, revealing a mean root weight of 1068 g in the control area and a mean root weight of 1341 g in the area of the present invention.

Example 16

Koshihikari Rice

In this example, rice plant was cultivated using the growth promoter commercially available under the tradename "Manda No. 31" by MANDA FERMENTATION CO., LTD.

The use of the promoter pertaining to the present invention to cultivate rice (Koshihikari) is described specifically by period. During seed soaking, the seeds were first disinfected and then immersed for 12 hours in solution diluted 2000-fold.

During the raising seedling stage, a 5000-fold diluted solution of the growth promoter pertaining to the present invention was sprayed on the leaves with a watering can 3 times in 7 day intervals, based on 1 L per square meter.

At the tillering stage, the growth promoter pertaining to the present invention was used in the form of a solution diluted 5000-fold to 10,000-fold at the time of use to spray the leaves once, based on 150 liters per 10 ares.

At the panicle formation stage, the growth promoter pertaining to the present invention was used in the form of a solution diluted 5000-fold to 10,000-fold at the time of use to spray the leaves once or twice, based on 150 liters per 10 ares.

At the ripening stage, the growth promoter pertaining to the present invention was used in the form of a solution diluted 5000-fold at the time of use to spray the leaves once, based on 150 liters per 10 ares.

During the aforementioned cultivation, "Yorin Keikaru," "Kasei 241," and "Yuki 61% (6106)" were used for initial fertilization, and "Yuki 26%" was used for follow-up fertilization.

The "Yorin Keikaru" referred to here, which contained P 6.0 kg/10 a, was used in an amount of 200 kg per 10 a. The "Kasei 241," which contained N 2.4 kg/10 a, P 2.8 kg/10 a, and K 2.2 kg/10 a, was used in an amount of 20 kg per 10 a.

The "Yuki 61%," which contained N 4.8 kg/10 a, P 8.0 kg/10 a, and K 4.8 kg/10 a, was used in an amount of 80 kg per 10 a. The "Yuki 26%," which contained N 3.0 kg/10 a, P 1.2 kg/10 a, and K 3.0 kg/10 a, was used in an amount of 34 kg per 10 a.

The aforementioned cultivation resulted in large rice, thin cellulose (rice bran), and higher yields of polished rice. Furthermore, the lower levels of rice screenings resulted in greater yields than in the past.

The rice that was obtained also had a higher sugar content and was sweeter.

Example 17

Koshihikari and Dontokoi Rice

In this example, rice cropping was cultivated using the growth promoter commercially available under the tradename "Manda No. 31" by MANDA FERMENTATION CO., LTD.

The use of the promoter pertaining to the present invention to cultivate rice (Koshihikari, Dontokoi) is described specifically by period. During seed soaking, the seeds were first disinfected and then soaked for 24 hours in solution diluted 2000-fold.

During the raising seedling stage, a 10,000-fold diluted solution of the growth promoter pertaining to the present invention was sprayed after the seedlings had been taken out from protected rice-nursery, and the nursery beds were also sprayed 8 and 15 days later. 18 to 20 plants per square meter were planted during transplanting.

During (1) the panicle formation stage and meiosis stage, (2) the first heading stage, (3) the middle heading stage, and (4) the ripening stage, the growth promoter pertaining to the present invention was sprayed on the leaves once in each stage in the form of an 8000-fold diluted solution, based on 120 L per 10 ares, followed by harvesting.

The aforementioned cultivation resulted in healthy rachis, perfect rice grain, and few rice screenings, with a resulting increasing in yield.

Example 18

Hinohikari Rice

In this example, rice was cultivated using the growth promoter commercially available under the tradename "Manda No. 31" by MANDA FERMENTATION CO., LTD.

The use of the promoter pertaining to the present invention to cultivate rice (Hinohikari) is described specifically by period. During seed soaking, the seeds were first disinfected and then soaked for 24 hours in solution diluted 2000-fold.

In the raising seedling stage, a 5000-fold diluted solution of the growth promoter pertaining to the present invention was sprayed.

In the transplanting of rice seedling, a 10,000-fold diluted solution of the growth promoter pertaining to the present invention was sprayed.

At the tillering stage, the growth promoter pertaining to the present invention was used in the form of a solution diluted 10,000-fold at the time of use to spray the leaves twice, based on 20 cc per 10 ares.

At the panicle formation stage, the growth promoter pertaining to the present invention was used in the form of a solution diluted 10,000-fold at the time of use to spray the leaves twice, based on 27 cc per 10 ares.

At a ratio of 1 unit sandy soil to 2 units chaff, 2 to 3 peeled apples per 100 L of 5000-fold diluted growth promoter pertaining to the present invention was mixed and the product was turned over two to three times a day so as not to exceed 50° C. The resulting fertilizer was fed and used for follow-up fertilization in an amount of 4 to 5 bales/10 a.

At the heading stage, the growth promoter pertaining to the present invention in the form of a 10,000-fold diluted solution was provided in the form of 100 cc drops.

The aforementioned cultivation resulted in thick, rigid main culm, and large, uniform grains.

The rice thus obtained was sweet and fragrant, and had a good luster when cooked.

Example 19

Koshihikari Rice 2

In this Example, rice was cultivated using the growth promoter commercially available under the tradename "Manda No. 31" by MANDA FERMENTATION CO., LTD.

The use of the promoter pertaining to the present invention to cultivate rice (Koshihikari) is described specifically by period. During seed soaking, the seeds were first disinfected and then soaked in solution diluted 5000-fold, followed by irrigation with a watering can.

In the raising seedling stage, a 7500-fold diluted solution of the growth promoter pertaining to the present invention was used for irrigation with a water can twice during the initial stage and four times during the latter stages, after which a solution diluted 1000-fold was used twice in the form of drops.

At the tillering stage, the growth promoter pertaining to the present invention was used in the form of a solution diluted 10,000-fold at the time of use to spray the leaves once.

At the panicle initiation stage, the growth promoter pertaining to the present invention was used in the form of a solution diluted 10,000-fold at the time of use to spray the leaves twice.

At the panicle formation stage, the growth promoter pertaining to the present invention was used in the form of a solution diluted 5000-fold at the time of use to spray the leaves twice.

Finally, at the ripening stage, the growth promoter pertaining to the present invention was used in the form of a solution diluted 3000-fold at the time of use to spray the leaves once.

The aforementioned cultivation resulted in uniform germination after seed soaking, broad coleoptile, and good root spread.

As a result, the plants took well after transplanting, with abundant panicle, and the yield resulted in few rice screenings.

The tasting level had an A ranking, with a mean 80.

Example 20

Fruit Tomatoes

The growth promoter commercially available under the tradename "Manda No. 31" by MANDA FERMENTATION CO., LTD. was used diluted 5000-, 8000-, and 10,000-fold in water to cultivate tomatoes in 20 a of soil in this Example.

At the stock seeding stage, 50 L of 10,000-fold diluted solution was used under irrigating water/200 hole tray conditions.

At the completion of the germinating stage, 50 L of 10,000-fold diluted solution was used as irrigating water.

At the scion seeding stage, 50 L of 10,000-fold solution was used under irrigating water/288 hole tray conditions.

At the subsequent completion of the germinating stage, 50 L of 10,000-fold diluted solution was used as irrigating water.

Stock was irrigated with 50 L of 10,000-fold diluted solution three times every 7 days, and scion were also irrigated with 50 L of 10,000-fold diluted solution three times every 7 days.

On the 7th day following grafting, 20 L of 10,000-fold diluted solution was used to spray the leaves.

On the 14th day following grafting, 20 L of 8000-fold diluted solution was used to spray the leaves.

On the 21st day following grafting, the plants were transplanted to 9 cm pots and then irrigated with 100 L of 10,000-fold diluted solution.

Following transplanting, the leaves were sprayed with 100 L of 10,000-fold diluted solution three times every 10 days using power sprayer.

Within 5 days following the emergence of seedlings, the leaves were sprayed with 150 L of 8000-fold diluted solution.

Within 4 days of transplanting, 80 to 100 L of 8000-fold diluted solution was used for folian spray spraying/irrigating water.

Following transplanting, 100 to 150 L of 8000-fold diluted solution was used to spray the leaves every 10 days.

At the hypertrophy stage, 150 L of 5000-fold diluted solution was used to spray the leaves.

The resulting tomatoes still had the inherent flavor of tomatoes, yet the sugar content was 3 degrees greater than those grown without the use of growth promoter.

Greater plumpness and coloring were noted, with fewer fruit cracking and greater shipping efficiency.

Example 21

Carrots

Carrots of the Honbeni Kintoki variety were planted approximately 10 to 15 cm apart in single rows at a row width of 1 m in two fields (4 m) of sandy soil.

For initial fertilization, 40 kg Tenporon, 120 kg Toyokelp, 100 kg High Green, and 240 kg of Fermen 5·5·5 containing N 12 kg/10 a, P 12 kg/10 a, and K 12 kg 10 a were used.

For pre-plant fertilization, 300 kg of Fermen 5·5·5 containing N 15 kg/10 a, P 15 kg/10 a, and K 15 kg 10 a was used.

For follow-up fertilization, 120 kg of Fermen 5·5·5 containing N 6 kg/10 a, P 6 kg/10 a, and K 6 kg 10 a was used approximately two months later.

The seeds used in section 1 of the present invention were planted after being soaked for a day and a night in 1000-fold diluted solution of the growth promoter commercially available under the tradename "Manda No. 31" by MANDA FERMENTATION CO., LTD., while those which had been soaked for a day and a night in 10,000-fold diluted solution were planted in section 2 of the present invention.

Following germination, the leaves in both sections were sprayed every 7 days with promoter diluted 10,000-fold in water.

As a control for comparison with the sections of the present invention featuring the use of the aforementioned growth promoter, carrots were cultivated under the same conditions except that no growth promoter was used.

Following harvest, the carrots grown in each section were measured to determine the average. In the control section, the total length was 82.4 cm, the root length was 40.0 cm, the total weight was 378.5 g, the root weight was 293.6 g, the root diameter was 46.6 mm, the yield per 10 a was 1.95 t, the Brix. was 9.5, and the rate of passing quality was 81.3%.

In contrast, in section 1 of the present invention (soaked in 1000-fold diluted solution), the total length was 87.2 cm, the root length was 37.1 cm, the total weight was 445.6 g, the root weight was 344.3 g, the root diameter was 49.1 mm, the yield per 10 a was 2.48 t, the Brix. was 11.2, and the rate of passing quality was 91.7%.

In section 2 of the present invention (soaked in 10,000-fold diluted solution), the total length was 88.0 cm, the root length was 36.8 cm, the total weight was 476.0 g, the root weight was 359.9 g, the root diameter was 51.4 mm, the yield per 10 a was 2.67 t, the Brix. was 9.1, and the rate of passing quality was 95.7%.

Thus, compared to the control section, both sections of the present invention had better yields and better rates of passing quality. Visual inspection also revealed that the roots were more slender than those in the control section.

The roots in the present invention were also shorter than those in the control section, which was attributed to the fact that the roots of the carrots in the sections of the present invention had grown deeper, and were thus broken off at the tip when harvested.

Example 22

Potatoes

Potatoes of the Dejima variety were transplanted about 38 cm apart in a quantity of 4385 per 10 a in sandy soil at a row width of 60 cm.

For initial fertilization, 150 kg/10 a High Green and 500 kg/10 a Tenporon were used.

For follow-up fertilization, potato-blended fertilizer containing N 10 kg/10 a was used.

The seeds used in section 1 of the present invention were soaked for 60 minutes in 1000-fold diluted solution of ruthe growth promoter commercially available under the tradename "Manda No. 31" by MANDA FERMENTATION CO., LTD. those in section 2 were soaked for 60 minutes in 2000-fold diluted solution, those in section 3 were soaked for 60 minutes in 5000-fold diluted solution, those in section 4 were soaked for 60 minutes in 10,000-fold diluted solution, and those in section 5 were soaked for 60 minutes in 20,000-fold diluted solution Following germination, the leaves were sprayed every 7 to 10 days with promoter diluted 10,000-fold in water in all sections.

As a control for comparison with the sections of the present invention featuring the use of the aforementioned growth promoter, potatoes were cultivated under the same conditions except that no growth promoter was used.

Following harvest, the number of potatoes grown in each section were examined, revealing 22,804 in section 1 of the present invention, 24,557 in section 2 of the present invention, 28,065 in section 3 of the present invention, 24,557 in section 4 of the present invention, 24,557 in section 5 of the present invention, and 24,120 in the control section.

The total yield (g) per 10 a was determined in each section, revealing 2769.2 g in section 1 of the present invention, 2761.3 g in section 2 of the present invention, 2786.2 g in section 3 of the present invention, 3104.6 g in section 4 of the present invention, 2948.4 g in section 5 of the present invention, and 2828.3 g in the control section.

The rate of passing quality was 73.4% in section 1 of the present invention, 70.0% in section 2 of the present invention, 66.5% in section 3 of the present invention, 70.9% in section 4 of the present invention, 59.8% in section 5 of the present invention, and 67.0% in the control section.

The overall results confirmed that soaking in 10,000-fold diluted solution (section 4 of the present invention) was more effective.

Example 23

Spinach

The Torai variety of spinach was grown in sandy soil in rows with a space of 5 to 8 cm between plants at a row width of 100 cm.

For initial fertilization, 450 L/10 a (30 L net) carbonized chaff, 50 kg/10 a (3.3 kg net) Azumin, 500 kg/10 a (33.8 kg net) Tenporon, 100 kg/10 a (16.2 kg net) High Green, and 240 kg (6.7 kg net) of Fermen 5·5·5 containing N 12 kg/10 a, P 12 kg/10 a, and K 12 kg 10 a were used.

For follow-up fertilization, the plants were irrigated with 20 L of 500-fold diluted solution of Kumiai No. 1 38 days following seeding, and with 20 L of 500-fold diluted solution of Zonne No.10 44 days following seeding.

The seeds used here were soaked for 2 hours in growth promoter commercially available under the tradename "Manda No. 31" by MANDA FERMENTATION CO., LTD. which had been diluted 2000-fold with water, and the seeds were then soaked for 4 hours in water flow.

In section 1 of the present invention, growth promoter diluted 30000-fold with water was used for irrigation in an amount of 1 L per square meter every 7 days following germination.

In section 2 of the present invention, growth promoter diluted 5000- to 10,000-fold with water was used to spray the leaves every 7 days following germination.

In section 3 of the present invention, growth promoter diluted 10,000- to 30,000-fold with water was used to spray the leaves every 7 days following germination.

As a control for comparison with the sections of the present invention featuring the use of the aforementioned growth promoter, spinach was cultivated under the same conditions except the seeds were soaked for 6 hours in water and then grown without the use of the growth promoter following germination.

Following harvest, the leaves of the spinach grown in the various sections were weighed to determine the average, revealing aweight of 15.9 g in section 1 of the present invention, 20.8 g in section 2 of the present invention, 24.1 g in section 3 of the present invention, and 16.3 g in the control section.

It was thus confirmed that the yield was greater in sections 2 and 3 of the present invention, in which the leaves had been sprayed.

Although the leaves were of a light weight in the control section and in section 1 of the present invention, in which the plants were irrigated, this was attributed to a drop in the ground temperature because section 1 of the present invention was irrigated during Winter.

Example 24

Soy Sauce 2

15 g of the fermented composition prepared as a food quality improver in Example 1 above and 500 g of dark soy sauce were mixed and stirred together, the mixture was stored while refrigerated for about 2 months, and the supernatant was collected to make the soy sauce pertaining to the present invention.

Dark soy sauce which had been stored while refrigerated for about 2 months was used for the control.

The two soy sauces were eaten with tofu by a panel of 12 members, and the inherent flavor of the soy sauces was evaluated using five ranks of numerical values, with a maximum of 5 points for good taste and a minimum of 1 point.

The sauce of the present invention was rated as having a mellowness averaging 3.5, whereas the control was 2.8

The average taste was rated 3.4 in the present invention, whereas it was 2.8 in the control.

It was thus confirmed that the sauce of the present invention was mellower and better tasting after 2 months of refrigerated storage.

Example 25

Jyuten Tofu

The fermented composition prepared as a food quality improver in Example 1 above was dissolved in water and mixed with soy milk.

This soy milk was used to manufacture approximately 300 g blocks of Jyuten Tofu as the product of the present invention.

0.2 g of the fermented composition was added per block.

As a control, Jyuten Tofu were manufactured under the same conditions except that the fermented composition was not used, and the amount of water per block was about 1 cc less than that in the present invention.

Both types of tofu were eaten with soy sauce by a panel of 10 members to examine the taste of the tofu using five ranks of numerical values, with a maximum of 5 points for good taste and a minimum of 1 point.

The average value for taste with soy sauce was 3.3 in the present invention, whereas it was 3.0 for the control, thus showing that the present invention had better taste with soy sauce.

The average value for appearance was 3.7 in the present invention, whereas it was 3.0 for the control.

Example 26

Kinugoshi Tofu

The fermented composition prepared as a food quality improver in Example 1 above was mixed with soy milk.

This soy milk was used to manufacture approximately 380 g blocks of Kinugoshi Tofu as the product of the present invention.

0.15 g of the fermented composition was added per block.

As a control, Kinugoshi Tofu was manufactured under the same conditions except that the fermented composition was not used.

Both types of tofu were eaten plain one day later by a panel of 12 members to examine the taste of the tofu using five ranks of numerical values, with a maximum of 5 points for good taste and a minimum of 1 point.

The average value for taste was 3.7 in the present invention, whereas it was 3.2 for the control, thus showing that the Kinugoshi Tofu in the present invention had better taste.

Example 27

Momen Tofu

The fermented composition prepared as a food quality improver in Example 1 above was mixed with soy milk.

This soy milk was used to manufacture approximately 380 g blocks of Momen Tofu as the product of the present invention.

0.19 to 0.29 g of the fermented composition was added per block.

As a control, Momen Tofu was manufactured under the same conditions except that the fermented composition was not used.

Both types of tofu were eaten plain by a panel of 12 members to examine the taste of the tofu using five ranks of numerical values, with a maximum of 5 points for good taste and a minimum of 1 point.

The average value for mouthfeel and hardness was 3.6 in the present invention, whereas it was 3.1 for the control, thus showing that the Momen Tofu in the present invention had better and soften mouthfeel.

Example 28

Udon Noodles

A dough was produced by 20 minutes kneading of the mixture of 250 g wheat flour and a solution which was prepared from 7.5 g table salt, 0.2 g fermented composition prepared as a food quality improver in Example 1 above and 120 g tap water.

The dough was then stored while refrigerated for about 3 hours, stretched into noodles about 3 mm thick, and cut with a kitchen knife to about 5 mm. The cut udon noodles were then boiled for about 12 minutes, and rinsed with water to remove the slime, resulting in the noodles of the present invention.

As a control, udon noodles were made under the same conditions except that the fermented composition was not used.

Both types of udon noodles were eaten plain by a panel of 7 members to investigate the consistency using five ranks of numerical values, with a maximum of 5 points for good consistency and a minimum of 1 point.

The average value for consistency was 4.1 in the present invention, whereas it was 3.7 for the control, thus showing that the udon noodles in the present invention had better consistency.

Example 29

Spiced Fish Eggs

The fermented composition was mixed in a 3000-fold diluted concentration with sauce used to manufacture spiced fish eggs.

Spiced fish eggs of the present invention were manufactured by a common method except for the use of sauce containing the fermented composition.

As a control, spiced fish eggs were prepared under the same conditions as those of the present invention, except that a conventional sauce which did not contain the fermented composition was used.

Both types of spiced fish eggs were frozen following manufacture and were then examined for fishy odor and microbes 2, 4, 8, and 16 days after thawing.

To examine the product for fishy odor, the spiced fish eggs were cut open, the outer skins were removed, and the interiors were collected and homogenized into a prepared product.

The prepared products were examined for odor by a panel of 10 members using five ranks of numerical values, with a maximum of 5 points for good odor and a minimum of 1 point.

The average value for fishy odor after 2 days was 3.6 in the present invention, whereas it was 3.1 for the control.

It was thus shown that the present invention was effective in suppressing the fishy odor of the spiced fish eggs.

To examine the preservation in particular, the odor of the spiced fish eggs was checked 4, 8, and 16 days later.

No differences were found between the two types of fish eggs after the 4th and 8th days.

After the 16th day, 4 members reported the present invention as having a "slight odor," and 1 member reported a "noticeable odor," whereas 5 members reported "slight odor" for the control, 2 members reported "odor," and 1 member reported "extremely noticeable odor."

To check for microbes, meanwhile, the-entire contents of half a block (han-hara) of both types of spiced fish eggs were homogenized with a Stomacher on the day of the test, and fixed amounts were sampled.

Samples were made by diluting the eggs 10-fold with sterile diluting water, and the general and halophilic bacterial counts were determined by the same methods as those used in common microbial tests.

In light of the fact that the specimens were marine products, physiological saline with 0.1% peptone added was used as the sterile dilution water, and standard agar medium containing 3% NaCl was used to detect halophilic bacteria.

The general bacterial count (number of colonies/1 g spiced fish eggs) after 2 days was $4.6 \times 10^3$ in the present invention and $5.0 \times 10^3$ in the control. After 4 days, it was $6.8 \times 10^3$ in the present invention and $6.6 \times 10^3$ in the control. After 8 days, it was $3.7 \times 10^3$ in the present invention and $9.0 \times 10^3$ in the control. After 16 days, it was $2.0 \times 10^4$ in the present invention and $1.0 \times 10^5$ in the control.

The halophilic cell count (number of colonies/1 g spiced fish eggs) after 2 days was $4.6 \times 10^3$ in the present invention and $5.9 \times 10^3$ in the control. After 4 days, it was $7.3 \times 10^3$ in the present invention and $7.7 \times 10^3$ in the control. After 8 days, it was $4.3 \times 10^3$ in the present invention and $1.0 \times 10^4$ in the control. After 16 days, it was $2.6 \times 10^4$ in the present invention and $6.5 \times 10^6$ in the control.

It could thus be demonstrated that the spiced fish eggs in the present invention were better preserved than those of the control.

Example 30

Kinugoshi Tofu (2)

0.36 g of the fermented composition prepared as a food quality improver in Example 1 above was mixed with 300 mL soy milk.

This soy milk and 9.6 mL bittern were used to manufacture Kinugoshi Tofu as Sample 1 of the present invention.

0.72 g of the fermented composition prepared as a food quality improver in Example 1 above was similarly mixed with 300 mL soy milk.

This soy milk and 9.6 mL bittern were also used to manufacture Kinugoshi Tofu as Sample 2 of the present invention.

As a control, Kinugoshi Tofu was manufactured by mixing 300 mL soy milk and 9.6 mL bittern under the same conditions except that the fermented composition was not used.

Both types of tofu were eaten plain by a panel of 12 members to rate the taste of the tofu. The lower the taste of soy, the better the flavor was evaluated, using five ranks of numerical values, with a maximum of 5 points for good taste and a minimum of 1 point.

The mean value was 3.3 for Section 1 of the present invention, 3.5 for Section 2 of the present invention, and 2.9 for the control.

That is, the tofu of the present invention had less soy taste, less soy odor, and a milder flavor.

Example 31

Rice Flour Dumplings 0.1 g of the fermented composition prepared as a food quality improver in Example 1 above was dissolved in 70 g water and mixed with 100 g rice flour, and the mixture was divided into dumplings of about 10 g in size.

The dumplings were boiled for about 5 minutes to make the rice flour dumplings of the present invention.

As a control, rice flour dumplings were made by mixing 70 g water and 100 g rice flour without using the fermented composition, by dividing the mixture into dumplings of about 10 g in size, and boiling them for about 5 minutes.

Both types of rice flour dumplings were eaten plain by a panel of 11 members to examine the stickiness of the dumplings, using five ranks of numerical values, with a maximum of 5 points for a favorable rating and a minimum of 1 point.

The mean value was 3.7 in the present invention and 3.4 in the control.

Example 32

Bread 0.2 g of the fermented composition prepared as a food quality improver in Example 1 above, 300 g enriched flour, 5 g dry yeast, 6 g salt, 15 g sugar, 15 g butter, 6 g skim milk, and 210 g hot water (about 40° C.) were used as starting materials to make the bread of the present invention by the direct kneading method.

As a control, bread was made by the same method as that of the bread in the present invention using the same starting materials except that no fermented composition was used.

Both types of bread were eaten plain by a panel of 14 members to rate the mouthfeel in terms of fluffiness, using five ranks of numerical values, with a maximum of 5 points for good mouthfeel and a minimum of 1 point.

The total value was 47 in the present invention, and 43 for the control.

Example 33

Yogurt 0.5 g of the fermented composition prepared as a food quality improver in Example 1 above, 480 mL (497 g) cow milk, and 10 g yogurt (starter) were used as starting materials to manufacture the yogurt of the present invention by a common method.

As a control, yogurt was manufactured under the same conditions as in the present invention except that no fermented composition was used.

Both types of yogurt were eaten plain by a panel of 11 members to evaluate freshness, milky odor, aftertaste, and overall flavor, using five ranks of numerical values, with a maximum of 5 points for a favorable rating and a minimum of 1 point.

The total value for freshness was 35 in the present invention, whereas it was 33 for the control. The total value for milky odor was 42 in the present invention, whereas it was 38 for the control.

The total value for aftertaste was 34 in the present invention, whereas it was 32 for the control. The total value for overall taste was 34 in the present invention, whereas it was 32 for the control.

Example 34

Bread (2)

5 g of the fermented composition prepared as a food quality improver in Example 1 above was used per 8 kg wheat flour. Said fermented composition was diluted with stock water and added to wheat flour.

The bread of the present invention was prepared by a common method except for the use of the stock water to which the fermented composition had been added.

As a control, bread was made by the same method as that of the bread in the present invention except that no fermented composition was used.

Both types of bread were eaten plain by a panel of 11 members to rate the mouthfeel in terms of fluffiness and to rate the softness of the bread by touch, using five ranks of numerical values, with a maximum of 5 points for a favorable rating and a minimum of 1 point.

The total value for mouthfeel in terms of fluffiness was 43 in the present invention, whereas it was 38 for the control.

The total value for soft feel was 42 in the present invention, whereas it was 35 for the control.

Example 35

Chicken Eggs

The fermented composition prepared as a growth promoter in Example 1 above was dissolved in an appropriate amount of water and fed to chickens with blended feed in the test group of the present invention.

The fermented composition was used in an amount of 20 mg per day per chicken.

The fermented composition was dissolved in the prescribed amount per chicken in suitable amounts of water when used.

As a control, chickens were fed under the same conditions as in the test group of the present invention except that no fermented composition was used.

Visual inspection of the groups produced by both groups revealed that the yolk was a deeper yellow color in the group of the present invention, and that the concentrated egg white was conspicuously thicker (Howe units).

Five eggs were taken from each group to measure the Howe units with an EMT-5000 multitester, revealing a mean value of 93.7 in the group of the present invention and 82.6 in the control group. The specific numerical values thus demonstrated that the concentrated egg white was conspicuously thicker in the group of the present invention.

The term "concentrated egg white" here is an indicator of chicken egg freshness related to the yolk consistency and thickness of the egg white.

It is known that the amount of concentrated egg white decreases and the amount of runny water-soluble egg white increases as freshness decreases, resulting in a loss of yolk consistency.

The egg shells and yolks of the eggs in both groups were weighed, revealing a greater egg shell weight ratio and greater egg yolk weight ratio in the group of the present invention.

That is, in the group of the present invention, the egg shell was 12.33%, the egg yolk was 28.25%, and the egg white was 59.42%, whereas in the control group, the egg shell was 11.94%, the egg yolk was 26.69%, and the egg white was 61.37%.

Egg size was also checked in both groups, revealing that the group of the present invention had greater numbers of the most valuable M size than did the control group.

When the aforementioned results are considered overall, it may be seen that better quality chicken eggs could be produced in the group of the present invention than in the control group.

Example 36

Beef

The fermented composition prepared as a growth promoter in Example 1 above was fed in an amount of 2 g per day per head directly at the tip of a spatula to raise Brown cattle.

After thus being fed the fermented composition for 2 to 3 months prior to shipment, 2 of every 3 head of cattle shipped were grade A-4, while 1 in 3 was A-3, whereas in a normal year they would have been only grade A-2 and A-3.

When initially raised, moreover, tumors believed to result from vitamin deficiencies were noted in the joints of the hindquarters of the cattle, but these improved during the administration of the fermented composition.

The fermented composition prepared as a growth promoter in Example 1 above was fed in an amount of 10 g per day per head directly at the tip of a spatula to raise Black cattle.

After thus being fed the fermented composition for 3 months prior to shipment, cattle were shipped at the highest rank of grade A-5, and the lie of the hair (color, gloss) was improved.

The above results demonstrated that the administration of the fermented composition as a growth promoter improved grade, irrespective of breed, whether Blown cattle, Black cattle, or the like.

Example 37

Ayu fish

Solid blended feed mixed with the fermented composition prepared as a growth promoted in Example 1 above was used to raise Ayu fish.

That is, the fermented composition in an amount 1/2500th that of the solid blended feed was mixed in feed oil after being dissolved in a small amount of water and was thoroughly stirred and dispersed, and the feed oil was then allowed to uniformly soak into the solid blended feed.

The solid blended feed was then given to the Ayu fish, which fed well and grew extremely well in a short period of time.

Example 38

Yellowtail

Dry pellets soaked with the fermented composition prepared as a growth promoted in Example 1 above were used to raise mojako (young Yellowtail).

That is, the fermented composition in an amount 1/800th to 1/1500th that of the feed was allowed to uniformly soak into the dry pellets after being dissolved in a small amount of water.

The dry pellets were given daily for about 2 months from the time the Mojako were delivered and once a week thereafter, resulting in fish of good color and condition, extremely slippery body surface, and uniform size. Apart from a fish preserve which averaged about 120 g/per fish, the fish grew well to an average 180 g/fish.

Example 39

Globefish

The fermented composition prepared as a growth promoter in Example 1 above was dissolved in a small amount of water and then mixed with feed (minced live bait) and used as fish feed to raise 2-year old fish weighing 300 to 500 g.

The fermented composition was used in an amount of 1 g per 10 kg feed.

In the past, many 2-year old fish died as a result of fatty deposits in the internal organs due to the lipids contained in feed, whereas virtually no deaths were noted during administration in the group of the present invention, and the fish grew well, with no fatty accumulation in the internal organs.

Example 40

Pearl Oyster

The fermented composition prepared as a growth promoter in Example 1 above was diluted 1000 to 10,000-fold with sea water, and the diluted solution was sprayed by a sprayer into the oysters before the shells were opened to introduce pearl kernels in May, June or July as seeding stage.

The seeded oysters were returned to the sea after being immersed for 30 minutes to 1 hour in water tanks containing the fermented composition diluted 5000 to 100,000-fold in sea water, and they were then grown normally.

At a rate of once every 1 to 2 months, the oysters were brought aboard or onto land and immersed as above.

As a result the oysters took in the plankton serving as feed well, their growth was promoted, and the mortality rate could be lowered even in environments with poor nutrition.

Example 41

Laver

When seedlings were being raised, laver nets were immersed in or were sprayed with a diluted solution of the fermented composition prepared as a growth promoter in Example 1 above diluted 1000 to 10,000-fold in seawater to grow laver.

This was done once to three times during the seedling stage.

After the seedlings had been grown, the seedling nets were immersed in a diluted solution of the fermented composition prepared as a growth promoter in Example 1 above diluted 1000 to 10,000-fold with sea water, they were dehydrated, and said seedling nets were placed in freezers.

The seedling nets were taken out of the freezers and immersed in a diluted solution of the fermented composition prepared as a growth promoter in Example 1 above diluted 1000 to 10,000-fold with sea water, and they were then spread out on the surface of the sea and grown.

Harvesting was done in week to 10 day intervals during growth (production and proliferation).

During this growth, the harvested laver nets were immersed in or sprayed with a diluted solution of the fermented composition prepared as a growth promoter in Example 1 above diluted 1000 to 10,000-fold with sea water.

As a result, the laver had thick leaves, a dark color, a lustrous surface, and better quality when processed into a final manufactured product (dried sheets).

In addition, it was found that the laver grown in the above manner was healthy and resistant to diseases such as "Barikan disease".

When the laver thus produced was processed into flavored laver, 0.5 wt % Manda Enzyme was added to the stock to prepare the flavored laver.

The resulting flavored laver still had the pronounced flavor and aroma inherent to laver, was mellow, and had a fresh aftertaste, even without the use of chemical seasonings such as sodium glutamate or sweeteners such as Stebia.

Example 42

Carp

The group of the present invention was given blended feed containing the fermented composition prepared as a growth promoter in Example 1 above to raise carp.

As the control group, carp were fed under the same conditions except that no fermented composition was used.

A 60 cm (approximately 60 L volume) glass aquarium was used as the test tank for both groups. A top filter was used for water circulation, and an automatic heater was used to keep the water warm at a constant temperature of 25° C.

Filtered well water was used as the growing water and was circulated on the day before the carp were raised. The test fish were carp 12 to 16.8 cm in length weighing 21.3 to 64.3 g (carp less than 1 year old).

Commercially available floating embryo base carp feed was used. In the group of the present invention, fermented composition in an amount of 0.2% of the feed weight was diluted 50-fold with water, then allowed to soak into the blended feed in its entirety, and then allowed to dry for 30 to 60 minutes at ordinary temperature.

In the test, the test fish were previously measured and weighed, and then divided into two groups of 11 fish each in two water tanks so as to ensure an even distribution of mean values. The group of the present invention was given blended feed soaked with the fermented composition, and the control group was given common blended feed.

The feed was given only once in the morning in an amount of 0.5% of the fish weight to both groups. All that was left after 15 minutes was removed, and the actual amount ingested was calculated based on the amount remaining.

If all the feed given was eaten within the prescribed time, the time taken until it was all eaten was recorded.

All the feed was eaten in the group of the present invention in all of 8 feedings from initial administration, indicating good feed consumption in a short time.

In the group of the present invention, all feed was consumed in 10 minutes the first time (initial administration), 14 minutes the second time, 10 minutes the third time, 5 minutes the fourth time, 7 minutes the fifth through seventh times, and 6 minutes the eighth time, for an extremely short average of 8 minutes and 15 seconds.

In contrast, in the control group, all the feed was consumed only the fifth, seventh, and eighth times, taking 14 minutes the fifth time, 14 minutes the seventh time, and 10 minutes the eighth time, for a longer average of 12 minutes and 40 seconds.

The amount ingested (g/fish) when all the feed could not be consumed by the control group was 0.09 the first time, 0.07 the second time, 0.15 the third time, 0.15 the fourth time, and 0.16 the sixth time.

The total amount of feed given to both groups during the test period was 1.52 (g/fish), but the actual amount ingested was 1.52 (g/fish) in the group of the present invention and 1.19 (g/fish) in the control group.

That is, the group of the present invention ate 27% more than the control group, demonstrating the effectiveness of the growth promoter.

The fish used in this test were sent by mail in bags.

In general, when fish are delivered and introduced into new water tanks, their appetite is adversely affected by stress during delivery or the unfamiliarity of the new water tank, particularly in the beginning. The amounts ingested were, in fact, low the first and second times in the control group.

The fact that the fish in the group of the present invention ate well from the beginning of feeding demonstrated that the present invention was effective as a feed promoter in alleviating stress associated with delivery and new environments.

What is claimed is:

1. A fermented composition comprising the following components and amino acids, and obtained by the processing of one or more species of each of the following classes:
   1) fruits, 2) edible roots, 3) grains, 4) beans or sesames, 5) seaweed, and 6) saccharides,
wherein,
   said 1) fruits are selected from the group consisting of apples, persimmons, bananas, pineapples, akebia, silvervine, figs, wild strawberries, strawberries, wild vines, grapes, Myrica, peaches, Japanese apricots, blueberries, raspberries, navel oranges, Hassaku oranges, Mandarin oranges, Sour oranges, oranges, Iyokan oranges, kumquats, citrons, Kabosu oranges, shaddocks, Ponkan oranges, lemons, limes, and mixtures thereof;
   said 2) edible roots are selected from the group consisting of Burdock, carrots, garlic, lotus root, lily bulbs, and mixtures thereof;
   said 3) grains are selected from the group consisting of brown rice, glutinous rice, polished rice, millet, corn, wheat, barley, Foxtail millet, Sawa millet, and mixtures thereof;
   said 4) (beans or sesames are selected from the group consisting of soybeans, black soybeans, azuki beans, black sesame, white sesame, walnuts, and mixtures thereof;
   said 5) seaweed is selected from the group consisting of Konbu, Wakame, Hijiki, laver, and mixtures thereof;
   said 6) saccharides are selected from the group consisting of brown sugar lump, fructose, glucose, and mixtures thereof; wherein
   said composition having the following components therein, and each 100 grams of the composition content having:
      water present in an amount of from 5.0 to 50.0 g;
      protein present in an amount of from 0.5 g to 10.0 g;
      lipids present in an amount of from 0.05 g to 10.00 g;
      non-fibrous carbohydrates present in an amount of from 30.0 to 75.0 g;
      fiber present in an amount of from 0.1 g to 5.0 g;
      ash present in an amount of from 0.5 g to 5.0 g;
      β-carotene present in an amount of from 10 μg to 150 μg;
      Retinol potency present in an amount of from 10 IU to 100 IU;
      Vitamin $B_1$ present in an amount of from 0.01 mg to 0.50 mg;
      Vitamin $B_2$ present in an amount of from 0.01 mg to 0.50 mg;
      Vitamin $B_6$ present in an amount of from 0.01 mg to 0.50 mg;
      Vitamin E present in an amount of 10.0 mg or less;
      niacin present in an amount of from 0.1 mg to 6.0 mg;
      calcium present in an amount of from 50 mg to 900 mg;
      phosphorus present in an amount of 200 mg or less;
      iron present in an amount of from 1.0 mg to 5.0 mg;
      sodium present in an amount of from 20 mg to 300 mg;
      potassium present in an amount of from 300 mg to 1000 mg;
      magnesium present in an amount of from 40 mg to 200 mg;
      sodium chloride deduced from sodium content to be present in an amount of from 0.05 mg to 1.00 g;
      copper present in an amount of 7.0 ppm or less; and further wherein said composition also having amino acids therein, each 100 grams of the composition content having:
  isoleucine present in an amount of from 30 mg to 200 mg;
  leucine present in an amount from 50 mg to 400 mg;
  lysine present in an amount from 20 mg to 200 mg;
  methionine present in an amount of from 10 mg to 150 mg;
  cysteine present in an amount of from 10 mg to 100 mg;
  phenylalanine present in an amount of from 30 mg to 250 mg;
  tyrosine present in an amount of from 20 mg to 200 mg;
  threonine present in an amount of from 40 mg to 200 mg;
  tryptophan present in an amount of from 1 mg to 100 mg;
  valine present in an amount of from 30 mg to 300 mg;
  histidine present in an amount of from 10 mg to 200 mg;
  arginine present in an amount of from 40 mg to 400 mg;
  alanine present in an amount of from 50 mg to 300 mg;
  aspartic acid present in an amount of from 100 mg to 600 mg;
  glutamic acid present in an amount of from 100 mg to 1200 mg;
  glycine present in an amount of from 30 mg to 300 mg;
  proline present in an amount of from 40 mg to 400 mg; and
  serine present in an amount of from 30 mg to 300 mg.

2. The composition according to claim 1, further comprising one or more additional items selected from the group consisting of honey, starch, cucumber, Perilla and celery.

3. A plant fertilizer containing as an active component the fermented composition defined in claim 1.

4. A dietary product for animals containing as an active component the fermented composition defined in claim 1.

5. A food preparation containing as an active component the fermented composition defined in claim 1.

6. A drink preparation containing as an active component the fermented composition defined in claim 1.

7. A noodle food preparation containing as an active component the fermented composition defined in claim 1.

8. A food additive containing as an active component the fermented composition defined in claim 1.

9. A fermented composition consisting of the following components and amino acids, and obtained by the processing of one or more species of each of the following classes:
  1) fruits, 2) edible roots, 3) grains, 4) beans or sesames, 5) seaweed and 6) saccharides,
wherein,
  said 1) fruits are selected from the group consisting of apples, persimmons, bananas, pineapples, akebia, silvervine, figs, wild strawberries, strawberries, wild vines, grapes, Myrica, peaches, Japanese apricots, blueberries, raspberries, navel oranges, Hassaku oranges, Mandarin oranges, Sour oranges, oranges, Iyokan oranges, kumquats, citrons, Kabosu oranges, shaddocks, Ponkan oranges, lemons, limes, and mixtures thereof;
  said 2) edible roots are selected from the group consisting of Burdock, carrots, garlic, lotus root, lily bulbs, and mixtures thereof;
  said 3) grains are selected from the group consisting of brown rice, glutinous rice, polished rice, millet, corn, wheat, barley, Foxtail millet, Sawa millet, and mixtures thereof;
  said 4) beans or sesames are selected from the group consisting of soybeans, black soybeans, azuki beans, black sesame, white sesame, walnuts, and mixtures thereof;
  said 5) seaweed is selected from the group consisting of Konbu, Wakame, Hijiki, laver, and mixtures thereof;
  said 6) saccharides are selected from the group consisting of brown sugar lump, fructose, glucose, and mixtures thereof; wherein
said composition having the following components therein, and each 100 grams of the composition content having:
  water present in an amount of from 5.0 to 50.0 g;
  protein present in an amount of from 0.5 g to 10.0 g;
  lipids present in an amount of from 0.05 g to 10.00 g;
  non-fibrous carbohydrates present in an amount of from 30.0 to 75.0 g;
  fiber present in an amount of from 0.1 g to 5.0 g;
  ash present in an amount of from 0.5 g to 5.0 g;
  $\beta$-carotene present in an amount of from 10 $\mu$g to 150 $\mu$g;
  Retinol potency present in an amount of from 10 IU to 100 IU;
  Vitamin $B_1$ present an amount of from 0.01 mg to 0.50 mg;
  Vitamin $B_2$ present in an amount of from 0.01 mg to 0.50 mg;
  Vitamin $B_6$ present in an amount of from 0.01 mg to 0.50 mg;
  Vitamin E present in an amount of 10.0 mg or less;
  niacin present in an amount of from 0.1 mg to 6.0 mg;
  calcium present in an amount of from 50 mg to 900 mg;
  phosphorus present in an amount of 200 mg or less;
  iron present in an amount of from 1.0 mg to 5.0 mg;
  sodium present in an amount of from 20 mg to 300 mg;
  potassium present in an amount of from 300 mg to 1000 mg;
  magnesium present in an amount of from 40 mg to 200 mg;
  sodium chloride deduced from sodium content to be present in an amount of from 0.05 mg to 1.00 g;
  copper present in an amount of 7.0 ppm or less; and further wherein
said composition also having amino acids therein, each 100 grams of the composition content having:
  isoleucine present in an amount of from 30 mg to 200 mg;
  leucine present in an amount from 50 mg to 400 mg;
  lysine present in an amount from 20 mg to 200 mg;
  methionine present in an amount of from 10 mg to 150 mg;
  cysteine present in an amount of from 10 mg to 100 mg;
  phenylalanine present in an amount of from 30 mg to 250 mg;
  tyrosine present in an amount of from 20 mg to 200 mg;
  threonine present in an amount of from 40 mg to 200 mg;
  tryptophan present in an amount of from 1 mg to 100 mg;
  valine present in an amount of from 30 mg to 300 mg;
  histidine present in an amount of from 10 mg to 200 mg;
  arginine present in an amount of from 40 mg to 400 mg;
  alanine present in an amount of from 50 mg to 300 mg;
  aspartic acid present in an amount of from 100 mg to 600 mg;
  glutamic acid present in an amount of from 100 mg to 1200 mg;
  glycine present in an amount of from 30 mg to 300 mg;
  proline present in an amount of from 40 mg to 400 mg; and serine present in an amount of from 30 mg to 300 mg.

10. A method for making the fermented composition defined in claim 1, comprising:

pulverizing and mixing one or more of said fruits and said edible roots;

maintaining the temperature of the resulting mixture at −4° C. to 40° C.;

adding sugar to the mixture;

adding one or more of each of said grains, beans, sesames, and seaweeds to said mixture and stirring said mixture;

maintaining said mixture, with occasional stirring, at said temperature range for a period of time sufficient to ferment and age said mixture; and removing and filtering the liquid fermented composition from said mixture.

11. The method for making the fermented composition defined in claim 10, wherein a member selected from the group consisting of starch, cucumber, Perilla and celery, and mixtures thereof, is also added into said mixture.

12. The method for making the fermented composition as defined in claim 10, wherein the temperature of the resulting mixture is maintained at −3° C. to 30° C.

13. The method for making the fermented composition as defined in claim 10, wherein the temperature of the resulting mixture is maintained at −2° C. to 20° C.

* * * * *